(12) United States Patent
Schoenauer et al.

(10) Patent No.: US 10,655,696 B2
(45) Date of Patent: May 19, 2020

(54) METHOD AND SYSTEM FOR ANALYZING THE WEAR BEHAVIOR OF BRAKE PADS/LININGS

(71) Applicant: KNORR-BREMSE Systeme fuer Nutzfahrzeuge GmbH, Munich (DE)

(72) Inventors: Manfred Schoenauer, Munich (DE); Wolfgang Pahle, Bad Wiessee (DE); Dirk Dresen, Leverkusen (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 218 days.

(21) Appl. No.: 15/880,793

(22) Filed: Jan. 26, 2018

(65) Prior Publication Data
US 2018/0163804 A1 Jun. 14, 2018

Related U.S. Application Data

(63) Continuation of application No. PCT/EP2016/066853, filed on Jul. 15, 2016.

(30) Foreign Application Priority Data

Jul. 27, 2015 (DE) .................. 10 2015 112 232

(51) Int. Cl.
*F16D 66/02* (2006.01)
*B60T 17/22* (2006.01)
(Continued)

(52) U.S. Cl.
CPC ............ *F16D 66/027* (2013.01); *B60T 8/171* (2013.01); *B60T 8/885* (2013.01); *B60T 17/22* (2013.01);
(Continued)

(58) Field of Classification Search
CPC ...... F16D 66/027; F16D 66/022; F16D 69/02; F16D 2069/002; F16D 2069/005;
(Continued)

(56) References Cited

U.S. PATENT DOCUMENTS 5,403,072 A 4/1995 Kilian et al.
7,694,555 B2 * 4/2010 Howell ................. B60T 17/221
73/129
(Continued)

FOREIGN PATENT DOCUMENTS

CN 102105718 A 6/2011
CN 102777520 A 11/2012
(Continued)

OTHER PUBLICATIONS

Chinese-language Office Action issued in counterpart Chinese Application No. 201680043814.0 dated Sep. 2, 2019 with English translation (eight pages).
(Continued)

*Primary Examiner* — Calvin Cheung
(74) *Attorney, Agent, or Firm* — Crowell & Moring LLP (57) ABSTRACT

A method for analyzing the wear behavior of brake pads of a brake system has at least the following steps: a) providing a brake system with at least one or more brakes, each with one or more brake pads which each have a pad carrier plate and a friction lining composed of at least two or more friction material layers which are composed of different friction materials; and at least one evaluation device; b) determining the wear which is brought about per brake during braking operations with at least one wear sensor per brake; c) determining the braking energy which is brought about per brake during braking operations with the evaluation device; d) repeated determination of an instantaneous gradient of a curve which relates the values determined in
(Continued)

steps b) and c) and preferably a route information item to one another; and e) outputting a signal at an output device if the gradient changes.

13 Claims, 8 Drawing Sheets (51) Int. Cl.
 *B60T 8/88* (2006.01)
 *B60T 8/171* (2006.01)
 *F16D 69/02* (2006.01)
 *F16D 69/00* (2006.01)

(52) U.S. Cl.
 CPC .......... *B60T 17/221* (2013.01); *F16D 66/022* (2013.01); *F16D 69/02* (2013.01); *B60T 2270/406* (2013.01); *F16D 2069/002* (2013.01); *F16D 2069/005* (2013.01)

(58) Field of Classification Search
 CPC .......... B60T 8/171; B60T 8/885; B60T 17/22; B60T 17/221; B60T 2270/406
 See application file for complete search history.

(56) References Cited

U.S. PATENT DOCUMENTS

| | | | |
|---|---|---|---|
| 9,157,820 | B2 | 10/2015 | Heise et al. |
| 9,416,835 | B2 * | 8/2016 | Antanaitis ............. F16D 66/026 |
| 9,964,168 | B1 * | 5/2018 | Pennala ................ F16D 66/024 |
| 10,060,490 | B2 | 8/2018 | Miller |
| 10,328,802 | B2 * | 6/2019 | Gaither ................ B60L 3/0076 |
| 2006/0266598 | A1 | 11/2006 | Baumgartner et al. |
| 2008/0236269 | A1 * | 10/2008 | Howell ................ B60T 17/221 73/121 |
| 2013/0299289 | A1 * | 11/2013 | Eichler ................ F16D 66/027 188/251 R |
| 2015/0152931 | A1 * | 6/2015 | Moore ................ F16D 66/022 188/1.11 L |
| 2016/0146279 | A1 * | 5/2016 | Philpott ................ B60T 8/885 188/1.11 L |
| 2016/0363182 | A1 * | 12/2016 | Eden ................ F16D 66/024 |
| 2019/0071062 | A1 * | 3/2019 | Robere ................ B60T 17/221 |

FOREIGN PATENT DOCUMENTS

| | | |
|---|---|---|
| CN | 104204599 A | 12/2014 |
| DE | 43 16 993 A1 | 11/1994 |
| DE | 43 16 993 C2 | 8/1995 |
| DE | 199 33 396 A1 | 1/2000 |
| DE | 101 27 480 A1 | 3/2002 |
| DE | 202 08 841 U1 | 8/2002 |
| DE | 101 50 047 A1 | 6/2003 |
| DE | 10 2009 011 986 A1 | 9/2010 |
| DE | 10 2010 043 320 A1 | 5/2012 |
| EP | 0 590 388 B1 | 12/1997 |
| EP | 0 859 164 A1 | 8/1998 |
| WO | WO 2007/139494 A1 | 12/2007 |

OTHER PUBLICATIONS

International Preliminary Report on Patentability (PCT/IB/373) issued in PCT Application No. PCT/EP2016/066853 dated Jan. 30, 2018, including English translation of Document C2 (German-language Written Opinion (PCT/ISA/237)) filed on Jan. 26, 2018 (Seven (7) pages).
International Search Report (PCT/ISA/210) issued in PCT Application No. PCT/EP2016/066853 dated Oct. 26, 2016 with English translation (Six (6) pages).
German-language Written Opinion (PCT/ISA/237) issued in PCT Application No. PCT/EP2016/066853 dated Oct. 26, 2016 (Five (5) pages).
German-language Office Action issued in counterpart German Application No. 10 2015 112 232.4 dated Mar. 22, 2016 (Eleven (11) pages).
Hindi language Office Action issued in Indian Application No. 201837003021 dated Jan. 30, 2020 with English translation (six (6) pages).
Cover Page of EP 2 033 168 A1 published Mar. 11, 2009 (one (1) page).

* cited by examiner

Figure 7: Example of wear curve based on converted energy input

Figure 8: Example of wear curve based on converted energy input, front axle at wear threshold

METHOD AND SYSTEM FOR ANALYZING THE WEAR BEHAVIOR OF BRAKE PADS/LININGS

CROSS REFERENCE TO RELATED APPLICATIONS

This application is a continuation of PCT International Application No. PCT/EP2016/066853, filed Jul. 15, 2016, which claims priority under 35 U.S.C. § 119 from German Patent Application No. 10 2015 112 232.4, filed Jul. 27, 2015, the entire disclosures of which are herein expressly incorporated by reference.

BACKGROUND AND SUMMARY OF THE INVENTION

The invention relates to a method for analyzing the wear behavior of brake pads and to a brake system for carrying out the method.

Figure 1A:
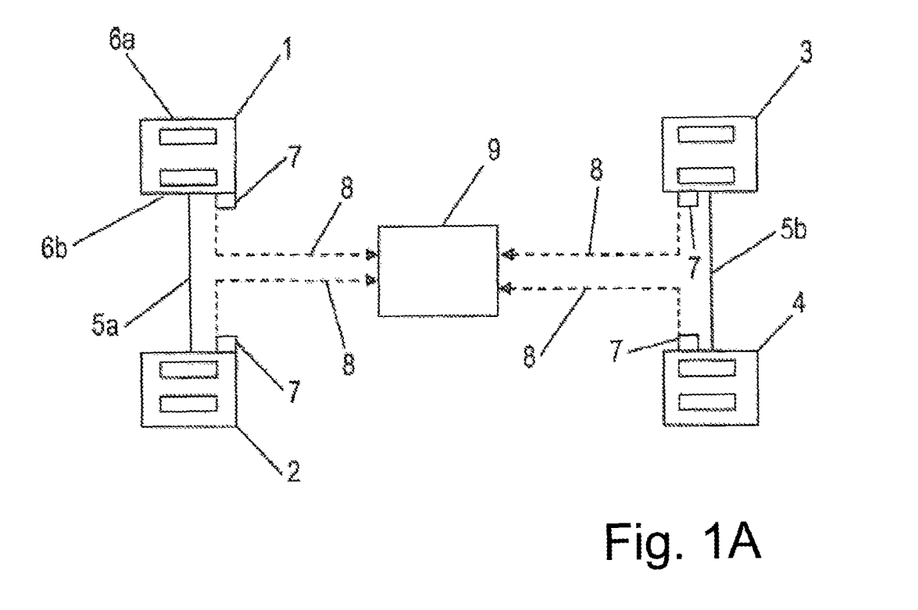
FIG. 1A is a highly schematic and simplified representation of a known vehicle brake system.

FIG. 1 shows a vehicle brake system for a vehicle comprising, in this case, e.g. four disc brakes 1, 2, 3, 4, which are disposed on two axles 5a (front axle, designated VA), 5b (rear axle, designated HA) and each of which has two brake pads 6a, 6b. During braking, each of these brake pads 6a, 6b is pressed against brake discs (not shown here) of the disc brakes 1-4 to slow down the vehicle. The brake pads 6a, 6b and the brake disc experience wear as a result of the braking operations. A known approach to determining the wear of the brake pads 6a, 6b and the brake disc as a sum signal is for wear sensors 7 on each the four disc brakes 1-4 to be linked to an evaluation device 9 via a connection such as a cable 8 or wirelessly. Said evaluation device can be designed—both in the prior art and in the invention—as part of a superordinate vehicle status determination and information system (is not shown in greater detail here).

According to the prior art shown in FIG. 1A, it is provided that each of the four disc brakes 1-4 has a pad wear sensor 7—hereafter also called the individual sensor—the outputs of which are each connected to the evaluation device 9 via one of the cables 8. The result is that, when the vehicle is in operation, information about the respective wear state of the brake pads 6a, 6b of the disc brakes is available at the evaluation device (see e.g. EP 0 590 388 B1). Using a terminal not shown here, it is determined whether the wear of the pads has progressed far enough that a pad replacement is required. In this case, a corresponding warning signal is emitted and fed to the evaluation device 9. When the brake pads reach a predetermined residual wear level, the evaluation device 9 emits a signal via an output device, such as a display, to indicate an upcoming pad replacement in order to prevent damage to the brakes, the brake components and the brake disc, and in order to avoid breaking through the used brake pads due to excessive wear. Known wear sensors—especially their terminals—are relatively expensive and require a relatively large amount of effort to install.

DE 101 50 047 A1 also discloses comparing the energy produced during braking with a braking energy determining value and, if this limiting value is exceeded, performing a corrective motion to compensate for the wear that has occurred.

According to a variant in DE 101 50 047 A1, the braking energy is calculated directly from the braking torque and the wheel rotation angle without additional sensors. The wheel rotation angle is preferably determined using an ABS system with a pole wheel sensor, which is always included in modern brake systems and therefore does not require any more complex instrumentation. It is also preferred that the braking torque is determined in a simple way from the brake cylinder pressure, which is likewise supplied to an EBS or ABS control computer and/or a control device (which can include a corresponding software routine as an evaluation device). Advantageously—this can be determined empirically—an adjustment is initiated each time an energy threshold of 2 to 8 MJ, in particular 5 MJ, is exceeded in order to reduce the incidence of the adjustment processes on the one hand and to maintain sufficient braking safety at all times on the other hand.

According to DE 101 50 047 A1—and this method is also well-suited as an example according to the invention—the braking energy is approximated from the rotation speed signal and the brake pressure signal:

$$W_B = M_B \varphi_B,$$

where
$W_B$:=braking energy;
$M_B$:=braking torque;
$\varphi_B$:=wheel rotation angle.

The wheel rotation angle is determined by a speed sensor that is required anyway, e.g. for an ABS and/or EBS function of a brake system for brake control, and that is thus already provided. The speed sensor consists of a pole wheel, which revolves with the wheel hub and a stationary transducer that registers the passing teeth, magnetic coils etc. of the pole wheel via a voltage pulse. With 100 teeth per pole rad, for example, a pulse thus corresponds to a wheel rotation angle of 3.6°. The evaluation device calculates the wheel rotation angle during the braking phase by adding up these pulses.

The braking torque is preferably calculated by means of the pressure sensor provided in an ABS/EBS system with the evaluation device by determining the brake cylinder pressure using the following formula:

$$M_B = (P_Z - P_{An}) A_Z i \varepsilon C^* r_{eff},$$

where:
$P_Z$=pressure in the brake cylinder and
$P_{An}$=application pressure of the brake
i=force transmission ratio of the brake
$\varepsilon$=mechanical efficiency of the force transmission mechanism of the Brake
$C^*$=brake coefficient$\approx 2 \times \mu_B$
$\mu_B$=coefficient of friction of the brake pad
$r_{eff}$=effective friction radius of the brake disc
Z=number of summed rotation angle pulses of an ABS pole wheel
$A_Z$=effective piston surface of the brake cylinder.

Additionally, the braking energy converted per rotation corresponding to a tooth of an ABS pole wheel, i.e. per speed pulse, can be calculated as follows:

$$W = (P_Z - P_{An}) K$$

where
$K = A_Z i \varepsilon C^* r_{eff} 2\pi/n$;
$P_Z$=pressure in the brake cylinder and
$P_{An}$=application pressure of the brake The converted braking energy is thus determined by simple relationships between the brake cylinder pressure signal and the number of wheel rotation pulses.

The formulas shown are meant as examples and do not necessarily have to be used to determine the braking energy. They are well-suited for disc brakes that are electromotively or pneumatically actuated and that have a floating, stationary or sliding caliper. Preferably, the adjustment system has at least one of the electromotive adjustment devices on both sides of the brake disc.

It is also known from DE 199 33 396 A1 that the braking energy can be used to determine the total wear of brake pads, added up over all braking operations since a pad replacement.

Against this background, the problem addressed by the invention is that of providing a simple method and a brake system, with which conspicuous developments in the pad wear behavior of brake pads are easy to detect.

The invention achieves this objective with a method and a brake system according to embodiments of the invention.

A method according to the invention preferably comprises at least the following steps:
a) providing a brake system with at least one or more brakes, each with one or more brake pads having a pad carrier plate and a friction lining consisting of two or more layers of friction material, which have different coefficients of friction and consist of different friction materials; and at least one evaluation device;
b) determining the wear per brake that occurs during braking by way of at least one wear sensor per brake;
c) determining the braking energy per brake during braking by way of the evaluation device;
d) repeatedly determining a momentary increase in a curve that correlates the values identified in steps b) and c) and route information to each other; and
e) emitting a signal to an output device when the increase changes.

The brakes used are preferably disc brakes, in particular pneumatic brakes, which are especially well-suited to utilizing the claimed method to monitor the wear on the brakes and to provide a timely indication of a pad replacement. In principle, however, the invention is also suitable for drum brakes.

To achieve different coefficients of friction, the layers of friction material can be compared entirely or partially of different friction materials.

A brake system with a lining wear sensor having individual sensors in the brake pads is further developed by the invention. In this regard, the prior art according to DE 101 50 047 A1 and DE 199 33 396 A1 is developed in a simple way in terms of the simple recognition of anomalies in the wear behavior of the brake pads.

When the wear per brake detected by the wear sensors is correlated with the energy input during braking operations, a curve, which is often a straight line at least in some sections, is formed for each wheel and/or disc brake 1-4 of the front and rear axles as mileage increases, and the slope or gradient of the curve is specific to the respective friction material and/or the respective coefficient of friction. Therefore, if the friction material changes at a transition between two layers of friction materials, the slope of the curve also changes significantly.

According to one advantageous development, the thickness of an outer layer of the friction material in the at least one brake pad 6a, 6b—or multiple brake pads 6a, 6b, especially all of them, of the vehicle and preferably of its trailer—corresponds to a final wear level of the brake pad or brake pads 6a, 6b, and a signal is emitted when the final wear level is detected on at least one of the brake pads 6a, 6b. When the transition from one friction material layer to the other is crossed, the brake system detects a change by carrying out comparison of the wear gradients (e.g. at regular intervals, in particular at kilometre intervals). Preferably, a defined action is then triggered, such as displaying the warning "Replace brake pad within the next X km".

The brakes employed are preferably disc brakes. However, the invention is also suitable in principle for drum brakes having brake linings. It is particularly advantageous when the disc brakes are configured as pneumatic disc brakes.

This type of final wear detection is useful especially in the case of uneven wear on the application-side and outer caliper-side brake pad, since other wear detection systems currently in use can generally detect only the total wear of the two brake pads and brake disc.

The invention also provides a brake pad for a brake system according to the invention, with a pad carrier plate and a friction lining consisting of at least two or more layers of friction material made from different friction materials with different coefficients of friction, wherein the thickness of one of the friction material layers of the brake pad corresponds to a final wear level of the brake pad. Friction linings with different coefficients of friction depending on the degree of wear are disclosed in EP 0 859 164 A1.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1B:
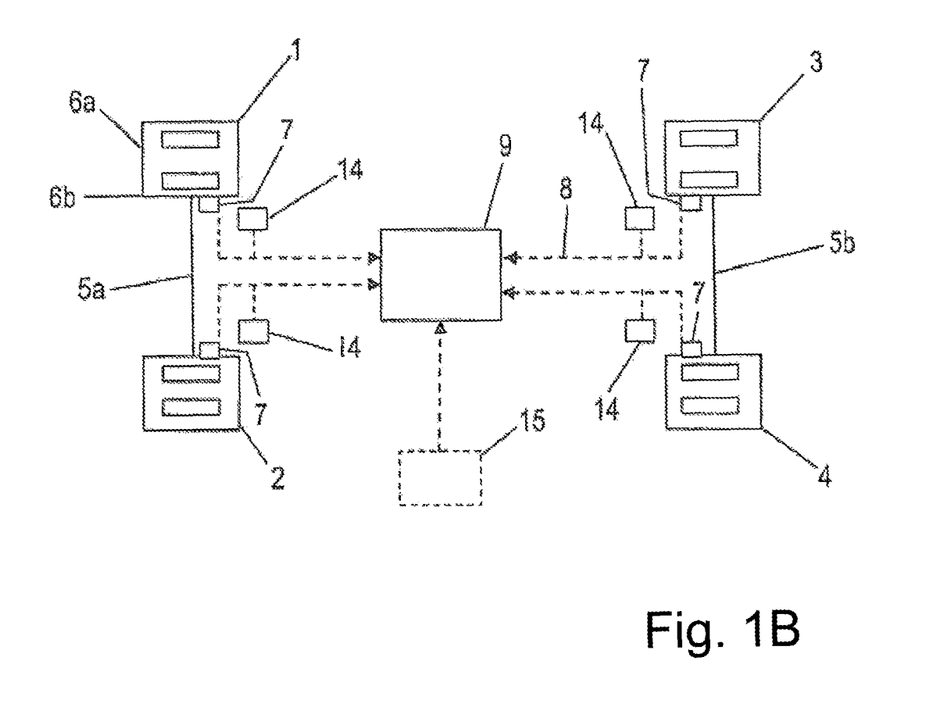
FIG. 1B is a highly schematic and simplified representation of a vehicle brake system according to an embodiment of the invention.

FIG. 1B shows a vehicle brake system comprising four disc brakes 1, 2, 3, 4, which are disposed on two axles 5a, b and which have two brake pads 6a, 6b each. During braking, each of the brake pads is pressed frictionally against a brake disc, which is not shown here. As in the prior art shown in FIG. 1A, it is provided that each of the four disc brakes 1-4 has a wear sensor 7, the outputs of which are each connected 8 to the evaluation device 9 so that, when the vehicle is in operation, information about the respective wear state of the disc brakes 1 through 4 is available on the evaluation device. According to one variant of the invention, it may be possible to omit terminals for the wear sensors, which leads to a reduction in costs, although alternatively it is also possible to keep them.

According to the invention, the current total wear of both brake pads and the brake disc is still recorded by a wear sensor 7, especially as described above. This value is not considered in isolation, though. Rather, an energy analysis is also performed. Thus, for example, signals regarding the rotation angle of the vehicle wheels (rotation angle sensor 14 on the wheels and/or near the disc brakes 1-4) and preferably regarding the torque (pressure sensor 16) as well as preferably information about the overall performance of the vehicle (preferably since a pad replacement, if one has already been carried out) are provided and evaluated in the evaluation device 9.

The braking energy can be detected in various ways here, such as in the manner according to DE 101 50 047 A1 or DE 199 33 961 A1 as described above. The converted braking energy substantially corresponds to the energy input during braking operations.

Figure 2:
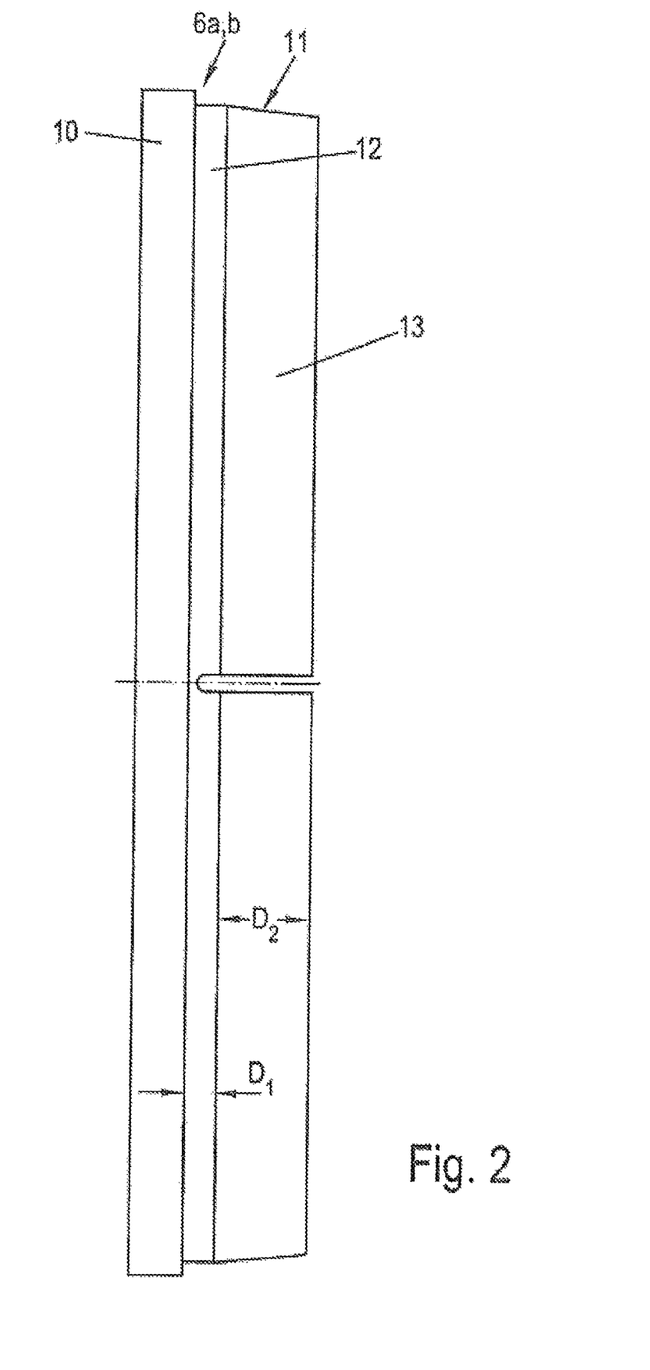
FIG. 2 is a top view of a brake pad for a vehicle.

FIG. 2 shows an advantageous brake pad 6a and b for a brake system of a vehicle having at least one or more disc brakes 1 through 4. This brake pad is advantageously suitable for the method according to the invention. The brake pad 6a is shown in a state in which wear has not yet occurred.

The brake pad 6a has a pad carrier plate 10, on which a friction lining 11 is disposed. The friction lining 11 consists of at least two layers of friction material 12, 13, which have different coefficients of friction and can be composed, for example, entirely or partially of different materials. The first layer of friction material 12 is arranged directly on the pad carrier plate 10. The second layer of friction material 13 is arranged on the side of said pad carrier plate 10 which faces away from the carrier plate 1.

Preferably, the thickness D1 of the first layer of friction material 12 between the pad carrier plate 10 and the second layer of friction material 13 is less than the thickness D2 of the second (outer) layer of friction material 13. The thickness D1 of the inner layer of friction material 12 preferably corresponds to a final wear level. This is a level at which a residual layer of lining material is still present on the carrier plate 10, but at which a pad replacement must be carried out immediately or at least within a prescribed remaining mileage interval in order to avoid a state in which the safety of the operation is jeopardized.

For this reason, the thickness D2 of the outer layer of friction material 13 is preferably dimensioned such that the outer layer of friction material 13 has been completely worn away once the final wear level is reached. Reaching this state is thus a suitable indicator to the driver that it will soon be necessary to replace the pads. Therefore, it is advantageous to detect in a simple way when this state is reached, and in particular to detect it in each brake pad of a vehicle individually.

Modern information systems in the vehicle—see the previously mentioned document DE 101 50 047 A1—process a multitude of data and measurement variables that, on the one hand, can be used to provide the driver and/or the vehicle operator information e.g for the planning of service intervals and, on the other hand, are also beneficial in simplifying diagnoses in service workshops in the event of malfunctions. An evaluation of wear is thereby possible. If this evaluation of wear is correlated with the energy converted during braking, the information about the distance already driven can also be used to determine the specific wear of the brake pads 6a, b of the disc brakes 1-4, based on the mileage in the form of a slope gradient, and can be stored in the memory.

Using this information, for instance, it is also possible to make a prediction about the remaining useful life of the brake pads. After a defined driving distance or service life of the vehicle, a comparison is carried out between the saved slope gradient and the new current gradient. If a significant change is detected, then the vehicle electronics can initiate an appropriate, freely definable action, e.g. emitting a warning signal for the driver.

In order to recognize when the brake pads reach the final wear level using the method described, brake pads 6a, b are installed that have a friction lining 11 supplied e.g. according to FIG. 2. The outer layer of friction material 13 appropriately has thickness D2, and the final wear level is reached at this amount of wear. If required, the brake pad 6a, b can also comprise more than two layers of friction material 12, 13 (not shown), wherein these layers of friction material 12, 13 can consist of two different material compositions, which are then alternatingly compressed, for example, or can also consist of multiple different materials so that the progression of the wear can be resolved in even greater detail, which could improve e.g. the quality of a possible prediction of the useful life of the brake pads. It should be noted that brake pads constructed from multiple layers of friction materials 12, 13 are known per se from the prior art. However, the essential advantages of said linings in connection with the monitoring of wear were not recognized.

If, with the aid of wear sensors 7 on the brakes, the wear evaluation is correlated with the energy converted during braking, influences such as a changing driving behavior and the like are not taken into account for the most part. Using the information about the distance already driven, a specific amount of wear can be calculated in the form of a slope gradient with respect to the service life of the brake pads.

As is shown in FIG. 3 through 8, at least one curve per wheel, in particular a straight line in at least some sections, is formed for each wheel and/or disc brake, and the slope or gradient of the curve is specific to the respective friction material. Thus if the slope changes, it may indicate, for example a change in the friction material or coefficients of friction.

A signal is preferably emitted to an output device at least when the slope changes beyond at least one predetermined fixed or variable limiting value. It is ensured in this way that the changes that arise are also significant enough that it is necessary to emit a signal. It is especially preferred that this be accomplished in that a signal is emitted by an output device in step f) at least when the slope exceeds a tolerance range or a tolerance band TB-VA or TB-HA. The tolerance range can be constant or can change, e.g. increase linearly, with increasing mileage.

When the transition from one friction material layer 13, 12 to the other is crossed, the brake system detects a change by way of step d) and/or by comparing the wear gradients. Preferably, a defined action is then triggered.

In the case of a double-layered friction material with layers of friction material 12, 13, wherein the thickness D1 of the friction material layers 12 lying directly against the pad carrier plate correspond approximately to the final wear level, the transition between the two materials can be detected by the change in gradient and can be displayed to the driver, such as on a screen or the like. (FIGS. 3-8). This replaces the function of a known cable wear sensor (terminal sensor).

Figure 3:
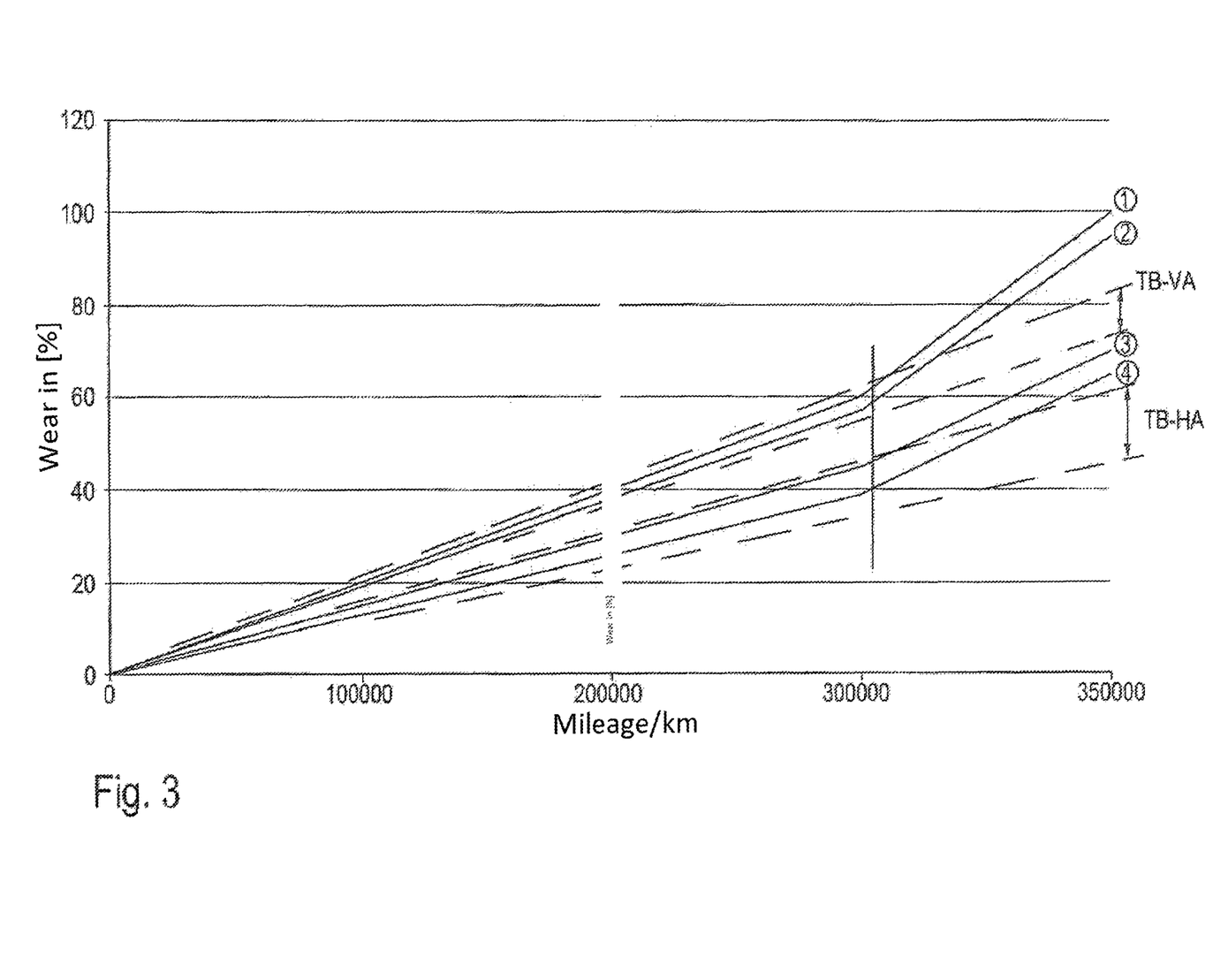
FIGS. 3-8 are diagrams indicating the wear of a lining material as a % of the lining material as a function of the vehicle mileage.

FIG. 3 shows a diagram in which a degree of wear in % relative to the mileage is applied as route information (since the last pad replacement).

The wear in % is thus a value that is determined e.g. from the quotient of a measured wear value and the calculation of the energy input during braking operations. This value is summed and plotted relative to the mileage. The resulting curve shows that after (or on) reaching a particular mileage (ca. 300,000 km) in all four disc brakes 1-4 of the two axles 5a, b of a vehicle brake system, the wear gradient changes, which indicates that the ratio between the measured wear value and the value from the calculation of energy input has changed. This demonstrates a transition from the outer layer of friction material 13 to the inner layer of friction material 12. The final wear level has been reached. A warning is emitted (immediately or at least within a prescribed mileage interval).

Also marked in FIG. 3 are a tolerance band TB-VA for the front axle and a tolerance band TB-HA for the rear axle.

Only when the curves lead out of the associated tolerance band TB-VA or TB-HA is it necessary to display a warning signal (in this case at ca. 300,000 km). Corresponding tolerance bands TB-VA and TB-HA are also shown in FIGS. 5, 6, 7 and 8. Here, the span of tolerance bands TB-VA and TB-HA increases as the mileage increases (measured from the last pad replacement), which is preferred but is not obligatory.

Figure 4:
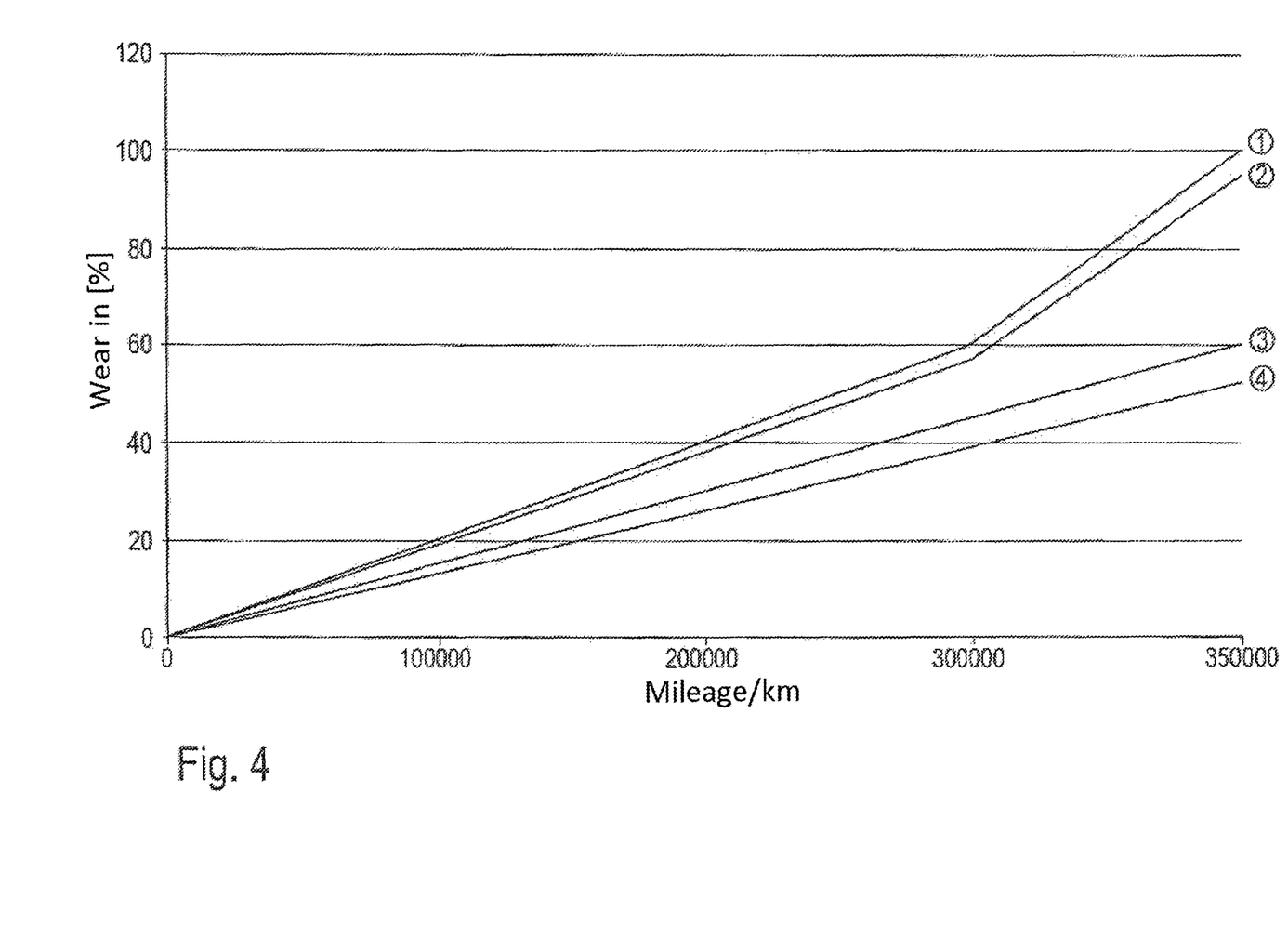

FIG. 4 shows that the wear gradient changes after (or on) reaching a particular mileage (ca. 300,000 km) only at the two disc brakes 1-2 of the front axle of a vehicle brake system. This demonstrates a transition at this axle from the outer layer of friction material 13 to the inner layer of friction material 12. In this instance, the final wear level on the front axle 5a is reached before the corresponding level is reached on the rear axle 5b. A warning is emitted (immediately or at any rate within a prescribed mileage interval) after one or both tolerance bands TB-HA and/or TB-VA is/are reached.

Figure 5:
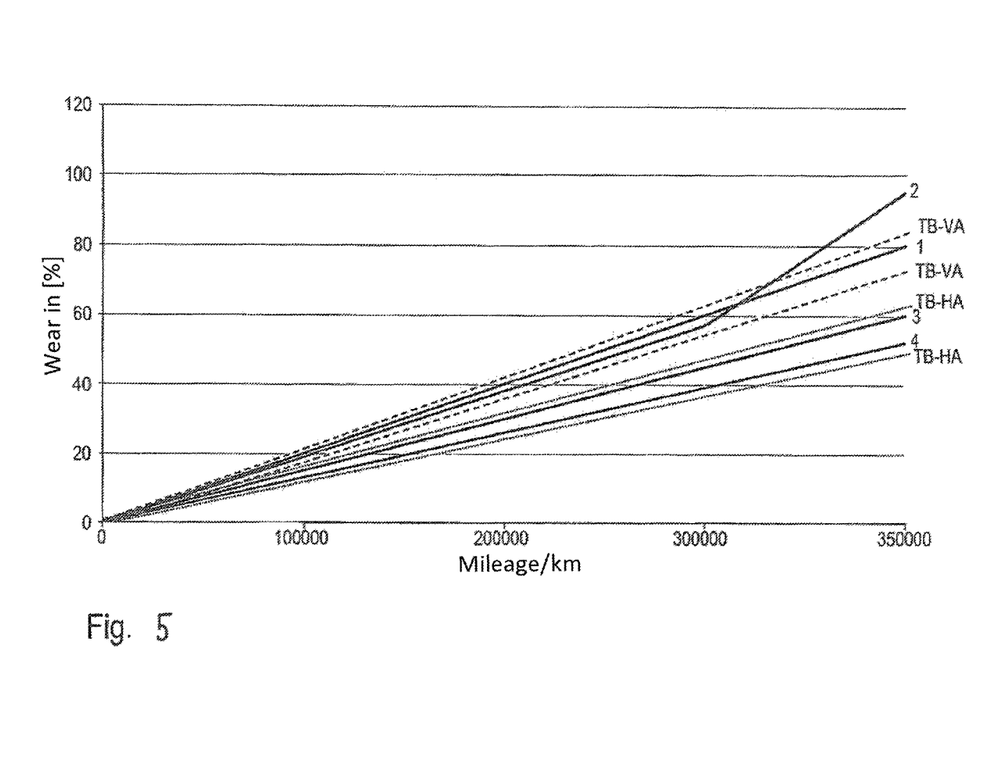
Figure 6:
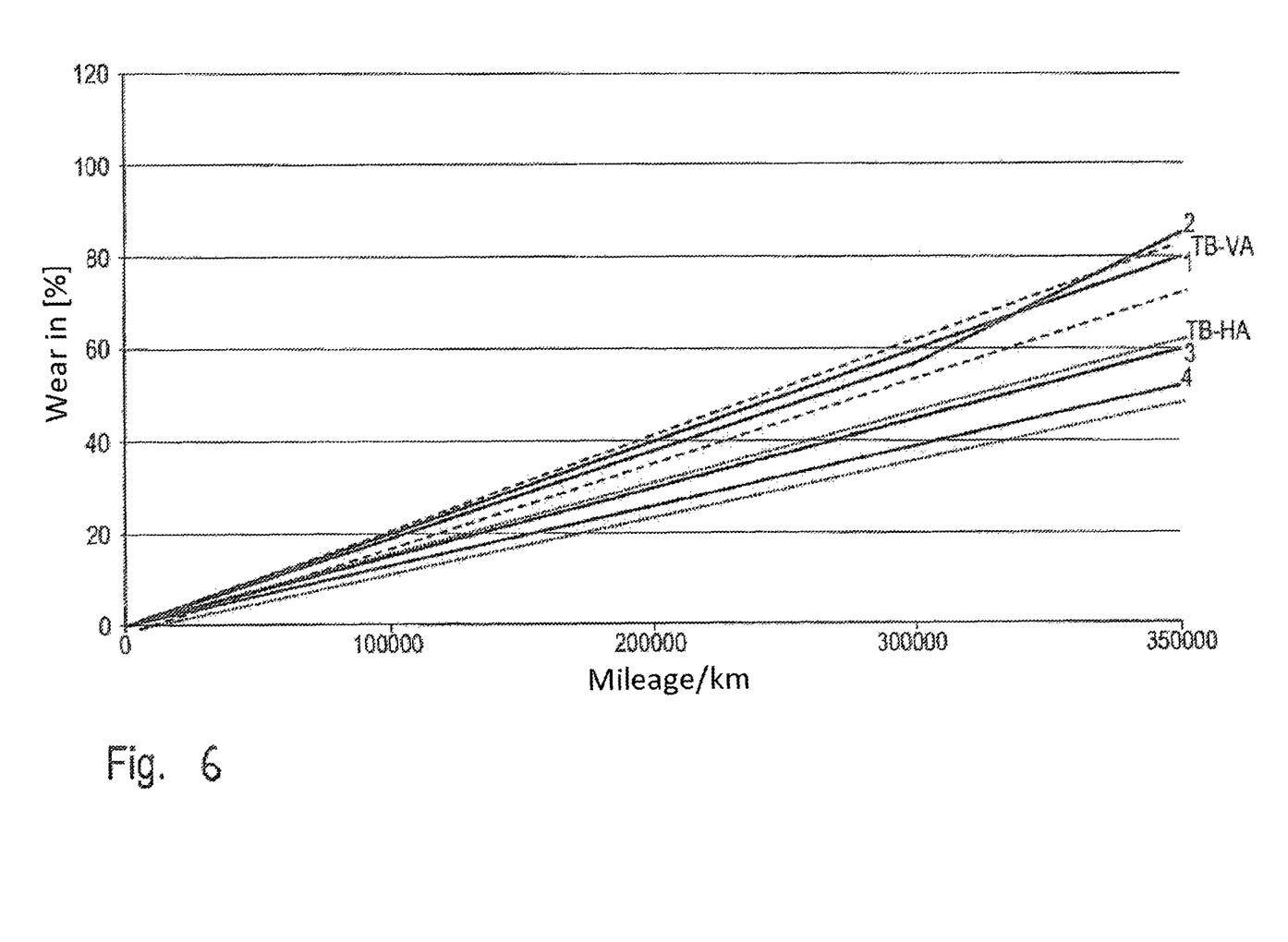

FIGS. 5 and 6 show that the wear gradient changes after (or on) reaching a particular mileage (ca. 300,000 km) on only one of the two disc brakes 2 of the front axle of a vehicle brake system, wherein the change is more pronounced in FIG. 5 than in FIG. 6.

It is apparent from each of FIGS. 5 and 6 that a transition from the outer layer of friction material 13 to the inner layer of friction material 12 has taken place only at one of the disc brakes—disc brake 2—of this axle 5a—the front axle in this case. The final wear level has therefore already been reached on the disc brake 2 of the front axle 5a. Thus a warning is also emitted here (immediately or at any rate within a prescribed mileage interval). This is because a change in the wear gradient also occurs when only one of the brake pads in the disc brake has reached its final wear level. FIG. 5 shows how this can be the case if one side is heavily soiled or e.g. if a malfunction, such as a defective caliper guide, occurs in the disc brake. These can prevent a pad from being completely worn out and, in the most unfavorable case, from being pulled through between the brake disc and carrier. The known total wear detection method usually cannot detect this malfunction.

Figure 7:
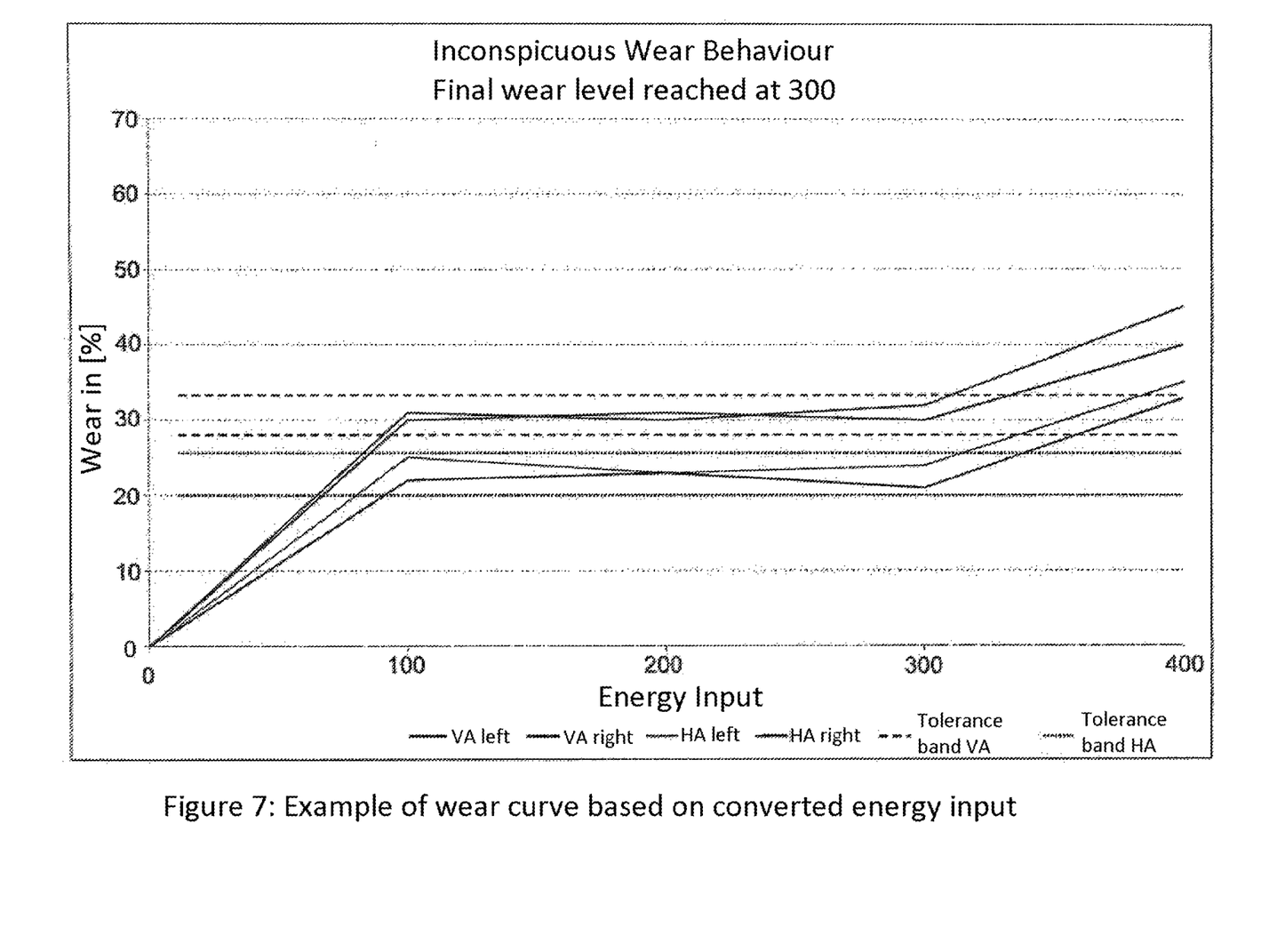
Figure 8:
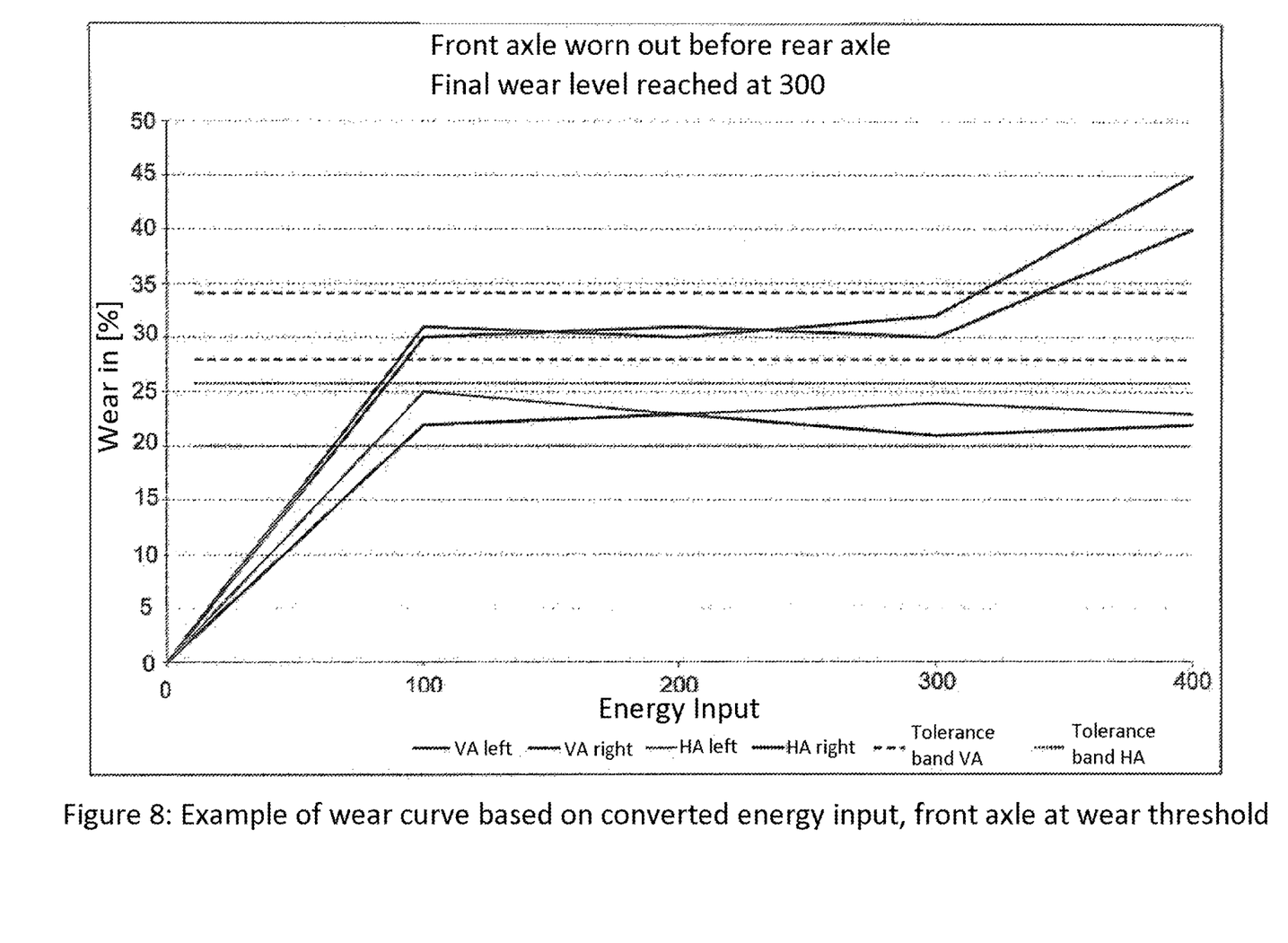

FIG. 7 and FIG. 8 show representations similar to those in FIGS. 3 and 4, but in which a degree of wear is applied via the energy input. This results in a constant and/or a straight line with a gradient of zero. Once again, as is shown in FIGS. 3 and 4, any deviation from this gradient of zero leads out of a tolerance band TB-HA and/or TB-VA and results in a warning signal.

LIST OF REFERENCE SIGNS

1 Disc brake
2 Disc brake
3 Disc brake
4 Disc brake
5a, b Axles
6a, b Brake pad/lining
7 Wear sensors
8 Cable
9 Evaluation device
10 Pad carrier plate
11 Friction lining
12, 13 Layers of friction material
14 Pole wheel sensor
15 Pressure sensor The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for analyzing wear behavior of brake pads, the method comprising the steps of:
   a) providing a brake system comprising an evaluation device and at least one or more brakes, each brake including one or more brake pads which have a pad carrier plate and a friction lining composed of two or more layers of friction material having different coefficients of friction;
   b) determining wear per brake which occurs during braking by way of at least one wear sensor per brake;
   c) determining braking energy per brake during braking by way of the evaluation device;
   d) repeatedly determining a momentary increase in a curve correlating values determined in steps b) and c) to each other; and
   e) emitting a signal to an output device when the momentary increase changes.

2. The method as claimed in claim 1, wherein a signal is emitted at the output device in step e) at least when a slope exceeds a prescribed limiting value.

3. The method as claimed in claim 1, wherein a signal is emitted by an output device in step e) at least when a slope exceeds a tolerance range or a tolerance band.

4. The method as claimed in claim 1, wherein all of the brake pads of the brake system have a lining carrier plate and a friction lining composed of two or more layers.

5. The method as claimed in claim 1, wherein a thickness of at least one of the layers of friction material in the at least one brake pad corresponds to a final wear level of said brake pad, and wherein a signal is emitted when said final wear level is detected.

6. The method as claimed in claim 1, wherein step d) further correlate route information.

7. A brake system, comprising:
   at least one or more brakes, each brake including one or more brake pads which have a pad carrier plate and a friction lining composed of two or more layers of friction material having different coefficients of friction and composed of different friction materials; and
   at least one evaluation device, the evaluation device being configured to execute a process to:
   a) determine wear per brake which occurs during braking by way of at least one wear sensor per brake;
   b) determine braking energy per brake during braking by way of the evaluation device;
   c) repeatedly determine a momentary increase in a curve correlating values determined in steps b) and c) to each other; and
   d) emit a signal to an output device when the momentary increase changes.

8. The brake system as claimed in claim 7, wherein a thickness of at least one of the layers of friction material in the at least one brake pad corresponds to a final wear level of said brake pad.

9. The brake system as claimed in claim 8, wherein the thickness of one of the outer layers of friction material is greater than the thickness of the inner layer of friction material.

10. The brake system as claimed in claim 9, wherein the brakes are disc brakes.

11. The brake system as claimed in claim 10, wherein the disc brakes are configured as pneumatic disc brakes.

12. The brake system as claimed in claim 7, wherein step c) further correlates route information.

13. A brake pad for use in a brake system comprising at least one or more brakes, and at least one evaluation device configured to execute a process to: a) determine wear per brake which occurs during braking by way of at least one wear sensor per brake; b) determine braking energy per brake during braking; c) repeatedly determine a momentary increase in a curve correlating values determined in steps b) and c) to each other; and d) emit a signal to an output device when the momentary increase changes, comprising:
 a pad carrier plate and a friction lining composed of at least two or more layers of friction material with different coefficients of friction, wherein
 a thickness of one of the friction material layers corresponds to a final wear level of the brake pad.

* * * * *